US012341767B2

(12) United States Patent
Saravanan et al.

(10) Patent No.: US 12,341,767 B2
(45) Date of Patent: Jun. 24, 2025

(54) APPLYING LOGGED-IN-USER-SPECIFIC 802.1x SECURITY ON A MULTI-USER CLIENT COMPUTING DEVICE

(71) Applicant: Dell Products L.P., Round Rock, TX (US)

(72) Inventors: Aswini Saravanan, Tamil Nadu (IN); Ashish Rakesh Singh, Mumbai (IN); Ramanujam Kaniyar Venkatesh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 252 days.

(21) Appl. No.: 18/051,691

(22) Filed: Nov. 1, 2022

(65) Prior Publication Data

US 2024/0146720 A1 May 2, 2024

(51) Int. Cl.
*H04L 9/40* (2022.01)
*H04L 67/143* (2022.01)

(52) U.S. Cl.
CPC ........ *H04L 63/083* (2013.01); *H04L 63/0823* (2013.01); *H04L 67/143* (2013.01)

(58) Field of Classification Search
CPC .. H04L 63/083; H04L 63/0823; H04L 67/143
See application file for complete search history.

(56) References Cited

U.S. PATENT DOCUMENTS

| | | | | |
|---|---|---|---|---|
| 7,257,836 | B1* | 8/2007 | Moore | H04W 12/069 726/19 |
| 7,590,684 | B2* | 9/2009 | Herrmann | H04L 63/20 709/219 |
| 8,875,252 | B2* | 10/2014 | Belton | H04L 63/10 726/1 |
| 9,288,671 | B2* | 3/2016 | Coghlan | H04W 12/069 |
| 10,841,316 | B2* | 11/2020 | Innes | H04L 63/0823 |
| 11,240,043 | B1* | 2/2022 | Leblang | H04L 67/025 |
| 2020/0389469 | A1* | 12/2020 | Litichever | H04L 12/4633 |
| 2023/0161860 | A1* | 5/2023 | Verma | G06F 21/35 726/18 |

* cited by examiner

*Primary Examiner* — Thomas J Dailey
(74) *Attorney, Agent, or Firm* — Kirton McConkie; Brian Tucker (57) ABSTRACT

Logged-in-user-specific 802.1x security can be applied on a multi-user client computing device. An 802.1x extension can be provided on a multi-user client computing device to leverage user credentials that are verified to log a user into the multi-user client computing device to select and perform 802.1x authentication for connecting the multi-user client computing device to a LAN. The 802.1x extension may also leverage the user credentials to obtain and use one or more certificates as part of the 802.1x authentication. When the user logs off of the multi-user client computing device, the 802.1x extension can automatically disconnect the multi-user client computing device from the LAN to prevent a subsequently logged in user from obtaining unauthorized access to the LAN.

20 Claims, 9 Drawing Sheets

APPLYING LOGGED-IN-USER-SPECIFIC 802.1x SECURITY ON A MULTI-USER CLIENT COMPUTING DEVICE

CROSS-REFERENCE TO RELATED APPLICATIONS

N/A

BACKGROUND

A multi-user client computing device is any client computing device that multiple users can log in to. As examples, a multi-user client computing device could be a desktop, laptop, thin client, or tablet having an operating system such as Windows or Linux that allows multiple users to log in. It has become common, particularly among enterprises, to provide multi-user client computing devices for use by employees, visitors, or other users.

802.1x is an authentication framework that is oftentimes used to control access to a local area network (LAN) or wireless LAN (WLAN). With 802.1x, a client computing device, which is referred to as a supplicant, connects to an authenticator, which is oftentimes a switch or wireless access point, and relies on the authenticator to perform authentication with an authentication server. If authentication is successful, the authenticator will allow the client computing device to access the LAN/WLAN.

When multi-user client computing devices are connected to a LAN/WLAN that uses 802.1x, various difficulties exist. Only an administrator (i.e., someone with admin-level privileges on the multi-user client computing device) can configure 802.1x on the multi-user client computing device. More specifically, to authenticate a multi-user client computing device via 802.1x, an administrator must turn on 802.1x authentication via the operating system-provided interface, select the type of authentication (e.g., MD5, TLS, PWD, FAST, Tunneled TLS, or PEAP), and input a username and password. These "802.1x authentication settings" are persisted on the multi-user client computing device and will be used regardless of which user is logged in. As a result, if an administrator configures 802.1x authentication on a multi-user client computing device for one user who should have access to the LAN, and another user who should only have access to a guest LAN logs in to the multi-user client computing device, that user will still have access to the LAN thus creating security risks. The only way to ensure that access to the LAN is handled properly for each user of the multi-user client computing device would be for the administrator to manually configure the 802.1x authentication settings each time a user logs in. This is unfeasible in enterprise environments and impractical in virtually all other environments.

Similarly, because there is no option to select the authentication type based on the user (i.e., the authentication type remains the same regardless of which user may log in), all users of a multi-user client computing device will use the same authentication type. Yet, there may be situations where it is desirable to use different authentication types for different users that may connect to a LAN. To address this issue, an administrator may oftentimes create isolated subnets in which different authentication types can be used. The administrator can then assign the multi-user client computing devices to the different subnets as appropriate. Yet, this increases the cost and overhead of the LAN/WLAN and still does not address the issue of having the same 802.1x authentication settings applied regardless of the user that may log in to a particular multi-user client computing device.

BRIEF SUMMARY

The present invention extends to systems, methods and computer program products for applying logged-in-user-specific 802.1x security on a multi-user client computing device. An 802.1x extension can be provided on a multi-user client computing device to leverage user credentials that are verified to log a user into the multi-user client computing device to select and perform 802.1x authentication for connecting the multi-user client computing device to a LAN. The 802.1x extension may also leverage the user credentials to obtain and use one or more certificates as part of the 802.1x authentication. When the user logs off of the multi-user client computing device, the 802.1x extension can automatically disconnect the multi-user client computing device from the LAN to prevent a subsequently logged in user from obtaining unauthorized access to the LAN.

In some embodiments, the present invention may be implemented as a method for applying logged-in-user-specific 802.1x security on a multi-user client computing device. In response to a first user logging in to a multi-user client computing device, user credentials of the first user that were used to log the first user into the multi-user client computing device can be obtained. 802.1x authentication can then be performed using the user credentials of the first user to attempt to connect the multi-user client computing device to a local area network.

In some embodiments, the present invention may be implemented as computer storage media storing computer executable instructions which when executed implement a method for applying logged-in-user-specific 802.1x security on a multi-user client computing device. In response to a first user logging in to a multi-user client computing device via a logon module, an 802.1x extension can obtain user credentials of the first user that were used to log the first user into the multi-user client computing device. The 802.1x can use the user credentials of the first user to obtain 802.1x authentication settings from a management solution. The 802.1x extension can then perform 802.1x authentication using the user credentials of the first user and in accordance with the 802.1x authentication settings to attempt to connect the multi-user client computing device to a local area network.

In some embodiments, the present invention may be implemented as a multi-user client computing device that includes one or more processors and computer storage media storing computer executable instructions which when executed implement an 802.1x extension that is configured to perform 802.1x authentication using user credentials that were used to log multiple users into the multi-user client computing device. In response to each of the multiple users logging in to the multi-user client computing device, the 802.1x extension can obtain user credentials of the logged in user that were used to log the logged in user into the multi-user client computing device. The 802.1x extension can then perform the 802.1x authentication using the user credentials of the logged in user to attempt to connect the multi-user client computing device to a local area network.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
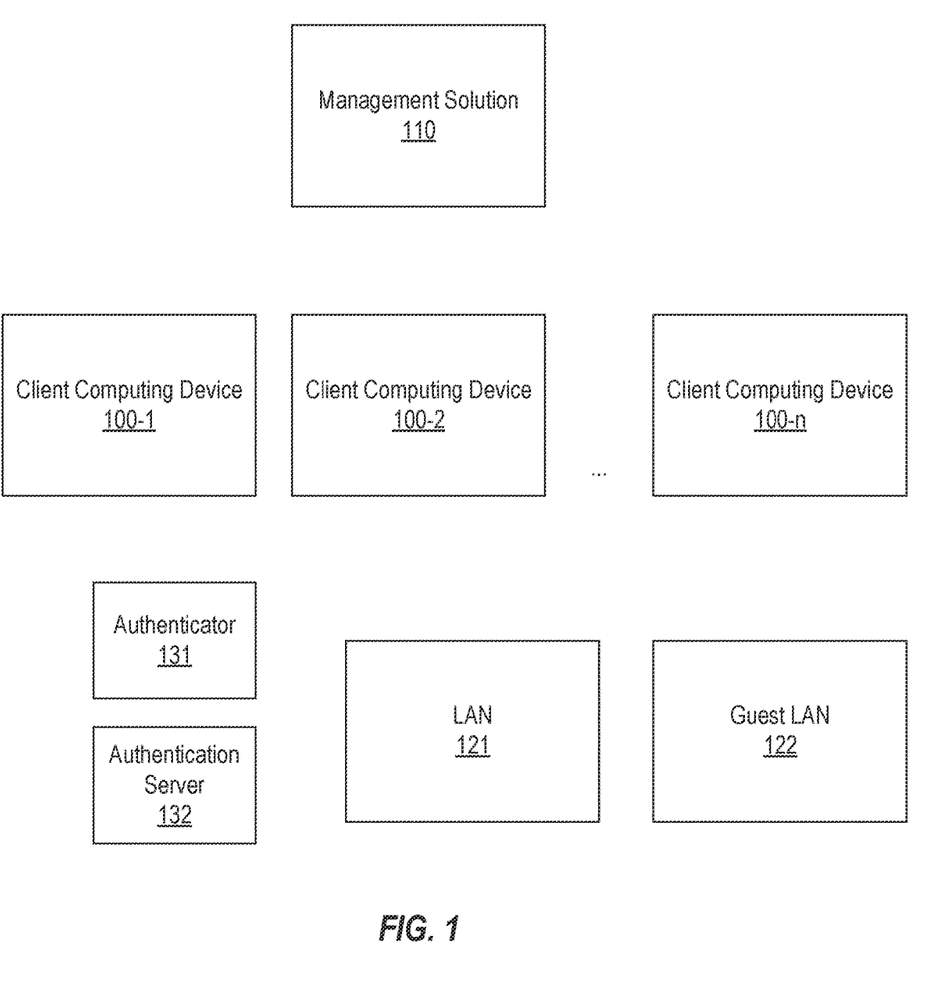
FIG. 1 provides an example of a computing environment in which embodiments of the present invention may be implemented.

FIG. 1 provides an example of a computing environment in which embodiments of the present invention may be implemented. This computing environment includes a number of client computing devices 100-1 through 100-*n* (generally client computing device(s) 100) which could be multi-user client computing devices and can function in the role of supplicants in the 802.1x framework, a management solution 110 that is used to manage client computing devices 100 (e.g., the Wyse Management Suite), a LAN 121 and a guest LAN 122 to which any of client computing devices 100 may be connected, an authenticator 131 that can function in the role of an authenticator in the 802.1x framework, and an authentication server 132 that can function in the role of an authentication server in the 802.1x framework. LAN 121 and guest LAN 122 can also represent a WLAN. In some cases, this computing environment could represent an enterprise's workplace. However, this computing environment could exist at any location.

Each of client computing devices 100 can include an operating system that supports 802.1x authentication. Authenticator 131 and authentication server 132 can be configured to support the various authentication types available in 802.1x for purposes of authenticating client computing devices 100 to be connected to LAN 121. Management solution 110 could be hosted in a public cloud or otherwise accessible to client computing devices 100.

In accordance with embodiments of the present invention, each of client computing devices 100 can be configured to perform 802.1x authentication to connect the client computing device to LAN 121 based on the currently logged in user's credentials and corresponding certificates. Each of client computing devices 100 may also be configured to automatically disconnect from LAN 121 when the currently logged in user logs off to thereby prevent any subsequently logged in user from gaining unauthorized access to LAN 121.

Figure 2:
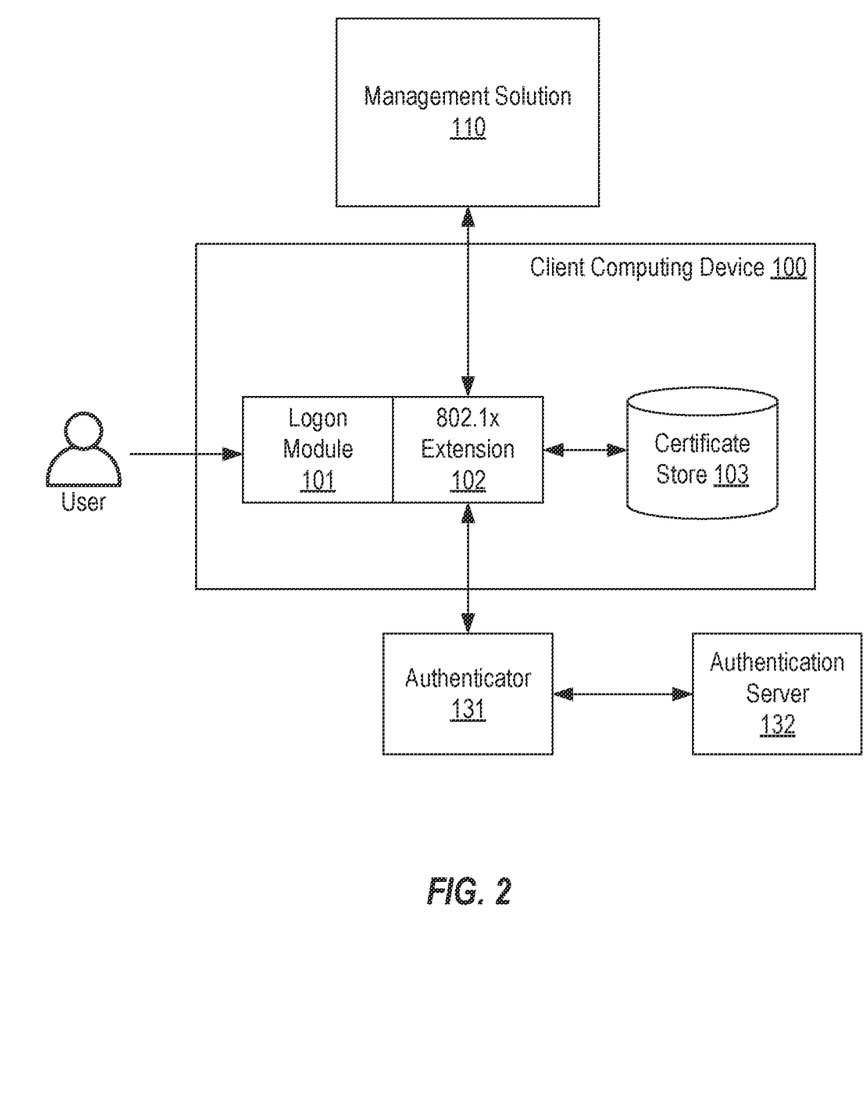
FIG. 2 provides an example of how a multi-user client computing device may be configured to enable logged-in-user-specific 802.1x security to be applied in accordance with embodiments of the present invention.

FIG. 2 provides an example of components that may be included on client computing device 100 to enable logged-in-user-specific 802.1x security to be applied on the client computing device including when it is a multi-user client computing device. As shown, client computing device 100 can include a logon module 101 that can be configured to log the user in to client computing device 100. As one example, if client computing device 100 runs a version of Windows, logon module 101 could represent Winlogon. As another example, if client computing device 100 runs a version of Ubuntu (Linux), logon module 101 could represent System Security Services Daemon (SSSD). In any case, logon module 101 can provide a way to verify user credentials (e.g., username and password) of a user that is attempting to log in to client computing device 100. This verification could be performed in any of the available ways (e.g., a typed in password or pin, facial recognition, fingerprint recognition, etc.)

In accordance with embodiments of the present invention, an 802.1x extension 102 can be added to or integrated with logon module 101 to leverage the user credentials verified by logon module to implement 802.1x authentication that is specific to the logged in user. As examples, 802.1x extension 102 could be a custom credential provider in Windows-based implementation or a pluggable authentication module in Linux-based implementations.

802.1x extension 102 can be configured to interface with management solution 110 to obtain information and/or configurations for implementing 802.1x authentication and can be configured to interface with authenticator 131 to perform the 802.1x authentication. For example, in some embodiments, management solution 110 may provide certificates to 802.1x extension 102 to be used in authenticating the logged in user with authentication server 132. In some embodiments, 802.1x extension 102 may store these certificates in certificate store 103. As an example, these certificates could be provided via the Simple Certificate Enrollment Protocol and could include one or more certificates for verifying a trust of management solution 110, one or more certificates for verifying a trust of the logged in user, and one or more certificates for verifying a trust of a private key to be used in the 802.1x authentication.

Figure 3A:
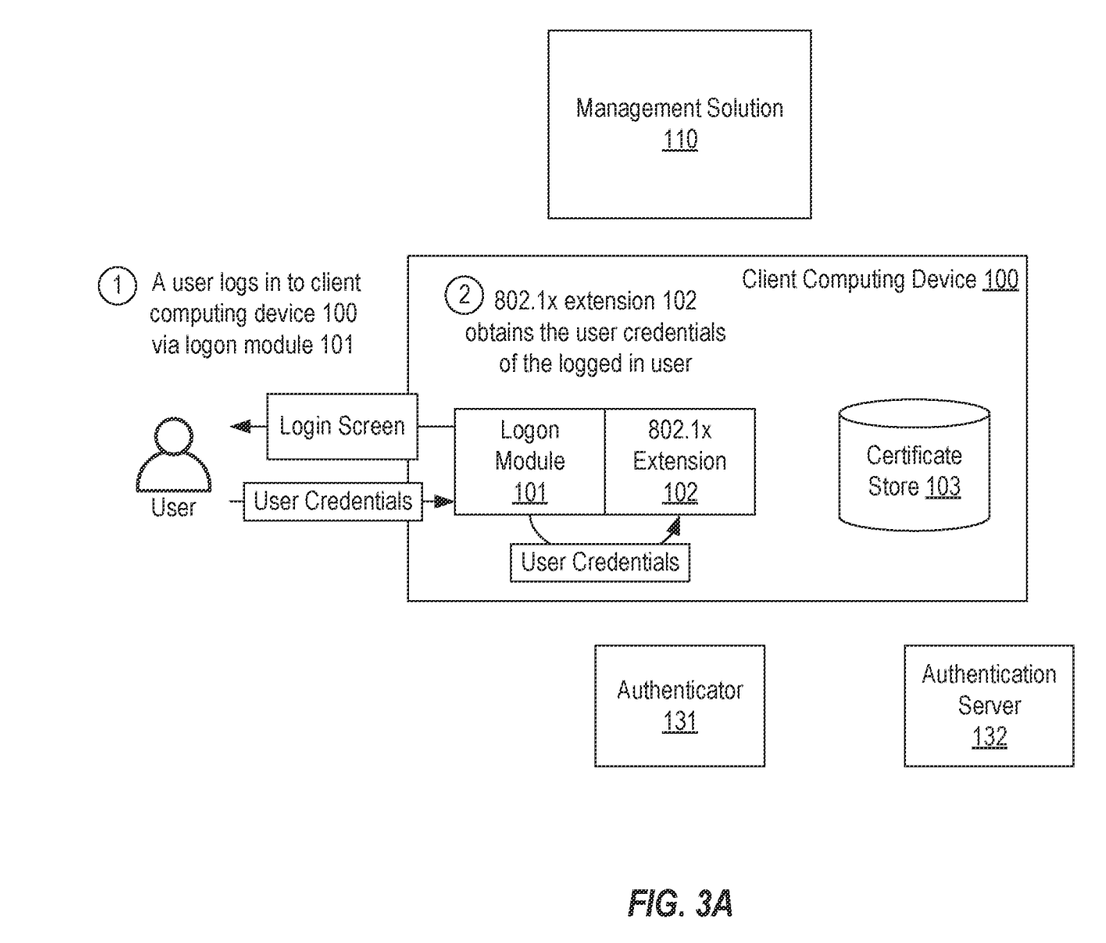
FIGS. 3A-3F provide an example of how logged-in-user-specific 802.1x security can be applied during 802.1x authentication on a multi-user client computing device in accordance with embodiments of the present invention.

FIGS. 3A-3F provide an example of how logged-in-user-specific 802.1x security can be applied on a client computing device 100 in accordance with embodiments of the present invention. Turning to FIG. 3A, in step 1, it is assumed that a user logs in to client computing device 100 via logon module 101. For example, the user could start up client computing device 100 and input a username and password into a login screen. In step 2, 802.1x extension 102 can obtain the user credentials of the logged in user from logon module 101.

Figure 3B:
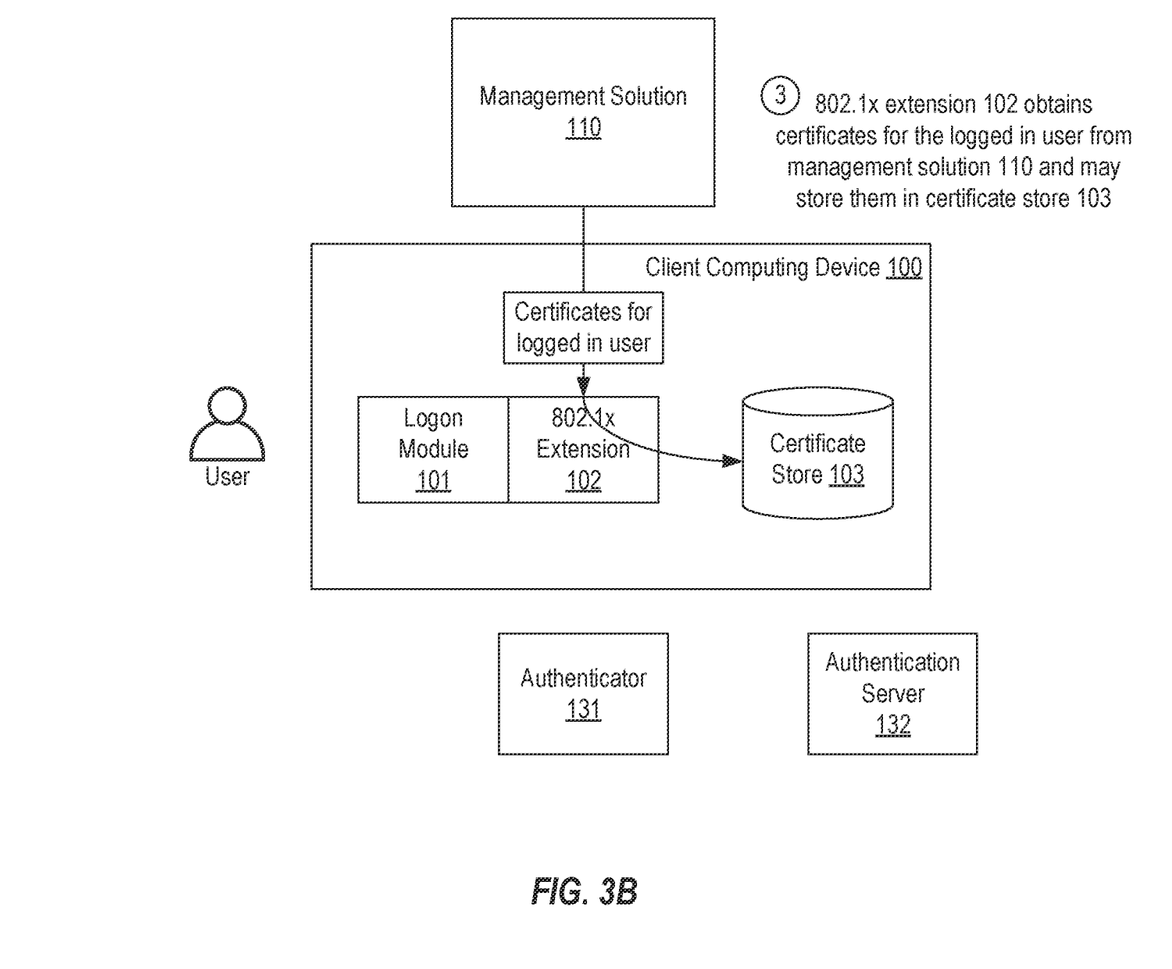

Turning to FIG. 3B, in step 3 and with the user now logged in, 802.1x extension 102 can obtain one or more certificates for the logged in user from management solution 110 and may store these certificates in certificate store 103. For example, 802.1x extension 102 could implement the Simple Certificate Enrollment Protocol to obtain and install certificates that can be used to verify the trust of the management solution 110 (or another server that may function as a certificate authority), the user credentials, cryptographic keys to be used in performing 802.1x authentication, etc. In some embodiments, step 3 may also entail receiving 802.1x configurations that are specific to the logged in user. For example, management solution 110 could inform 802.1x extension 102 of an authentication type that should be used in the 802.1x authentication that will be performed for the logged in user. This ability to dynamically select 802.1x configurations for client computing device 100 based on the logged in user can eliminate the need to create isolated subnets to allow users to use different authentication types.

Figure 3C:
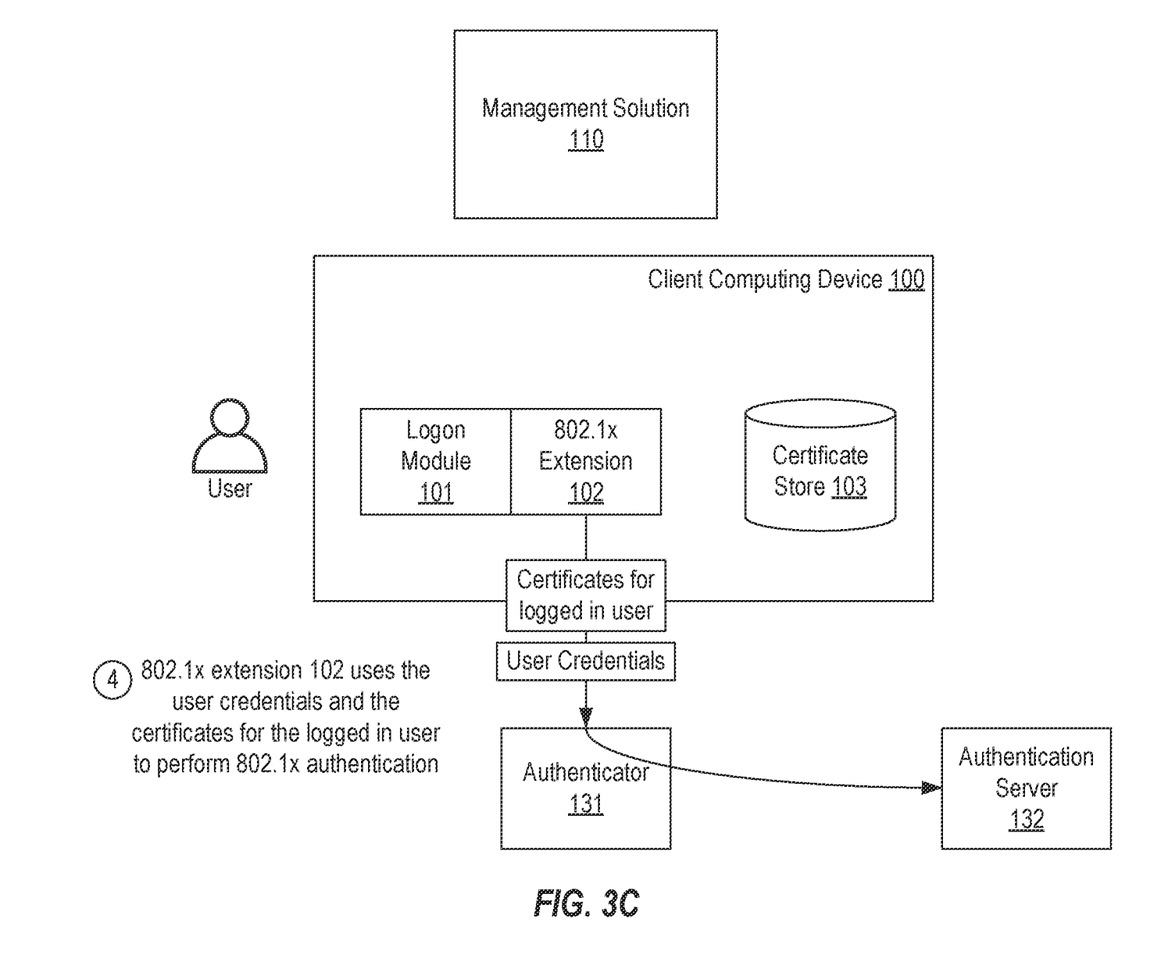

Turning to FIG. 3C, in step 4, 802.1x extension 102 can use the user credentials and the certificates for the logged in user to perform 802.1x authentication for purposes of connected client computing device 100 to LAN 121. In other words, the user credentials that were used to log the user in to client computing device 100 as well as the certificates corresponding to those user credentials are used to determine whether client computing device 100 is authorized to be connected to LAN 121. As indicated, this 802.1x authentication can be performed with authentication server 132 via authenticator 131.

Figure 3D:
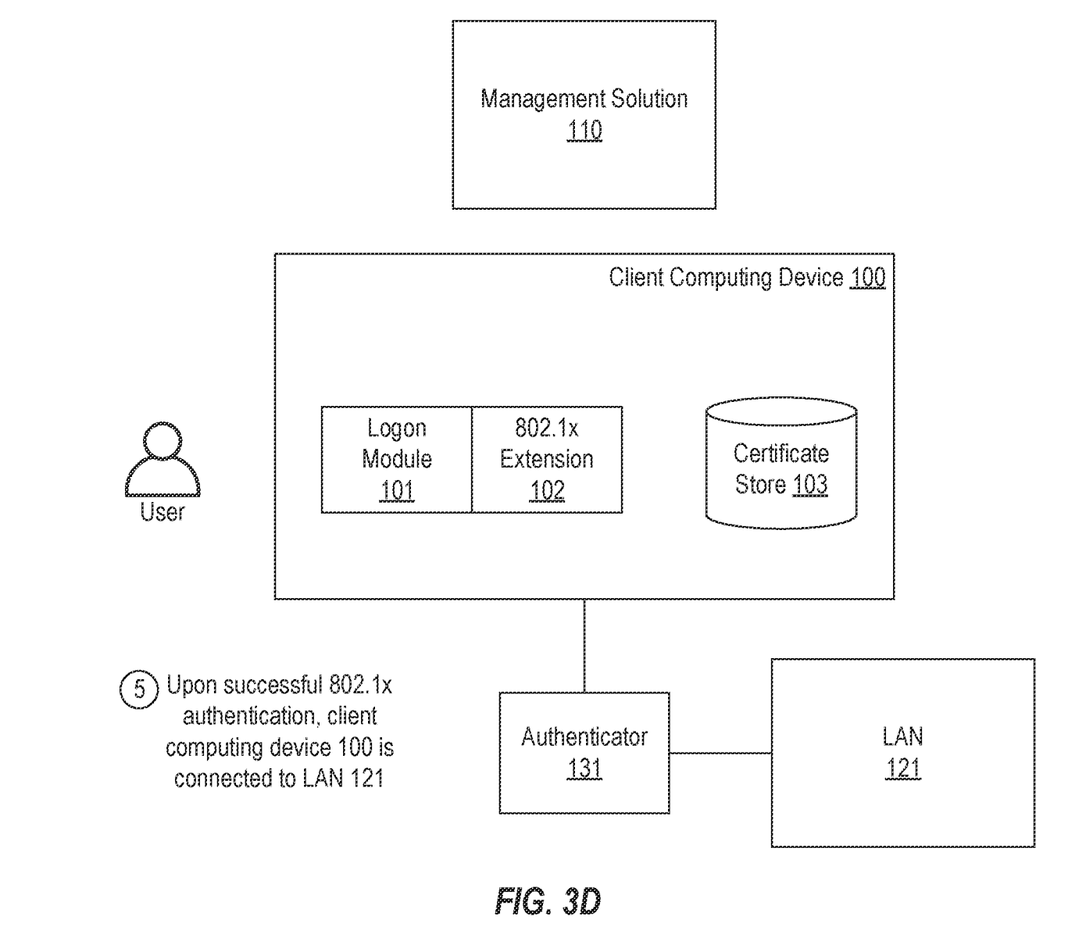

Turning to FIG. 3D, in step 5, it is assumed that the 802.1x authentication is successful and therefore authenticator 131 allows client computing device 100 to connect to LAN 121. For example, authenticator 131 could verify that the user to which the user credentials pertain is authorized to access LAN 121 (e.g., via Active Directory, an LDAP server, etc.), including using the certificates as part of this process (e.g., to decrypt the user credentials or otherwise use the certificates for the selected type of authentication), and can then open a port by which client computing device 100 connects to LAN 121.

Figure 4:
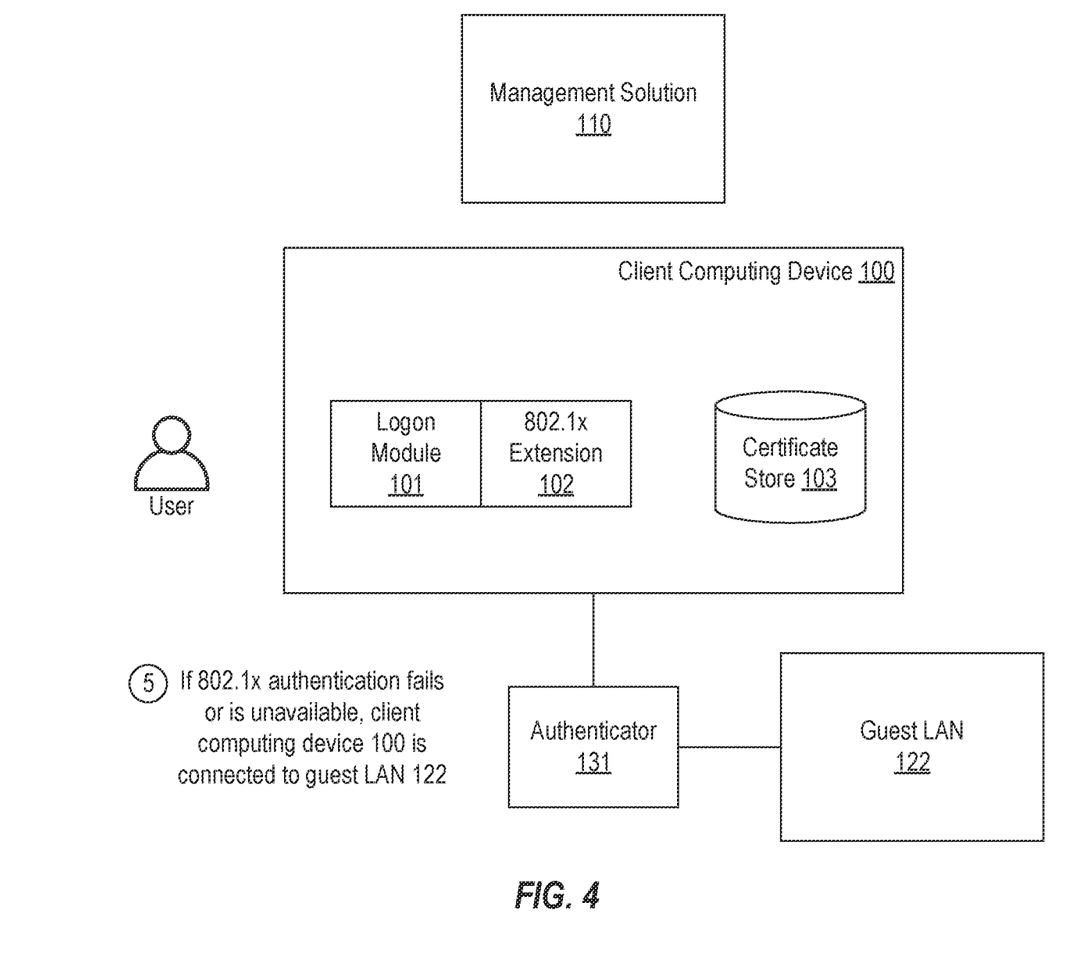
FIG. 4 provides an example of how a multi-user client computing device can be connected to a guest LAN when logged-in-user-specific 802.1x security results in the 802.1x authentication being unsuccessful in accordance with embodiments of the present invention.

In some embodiments, if 802.1x authentication is unsuccessful or unavailable, authenticator 131 may connect client computing device 100 to guest LAN 122 rather than to LAN 121. Such a scenario is represented in FIG. 4.

Figure 3E:
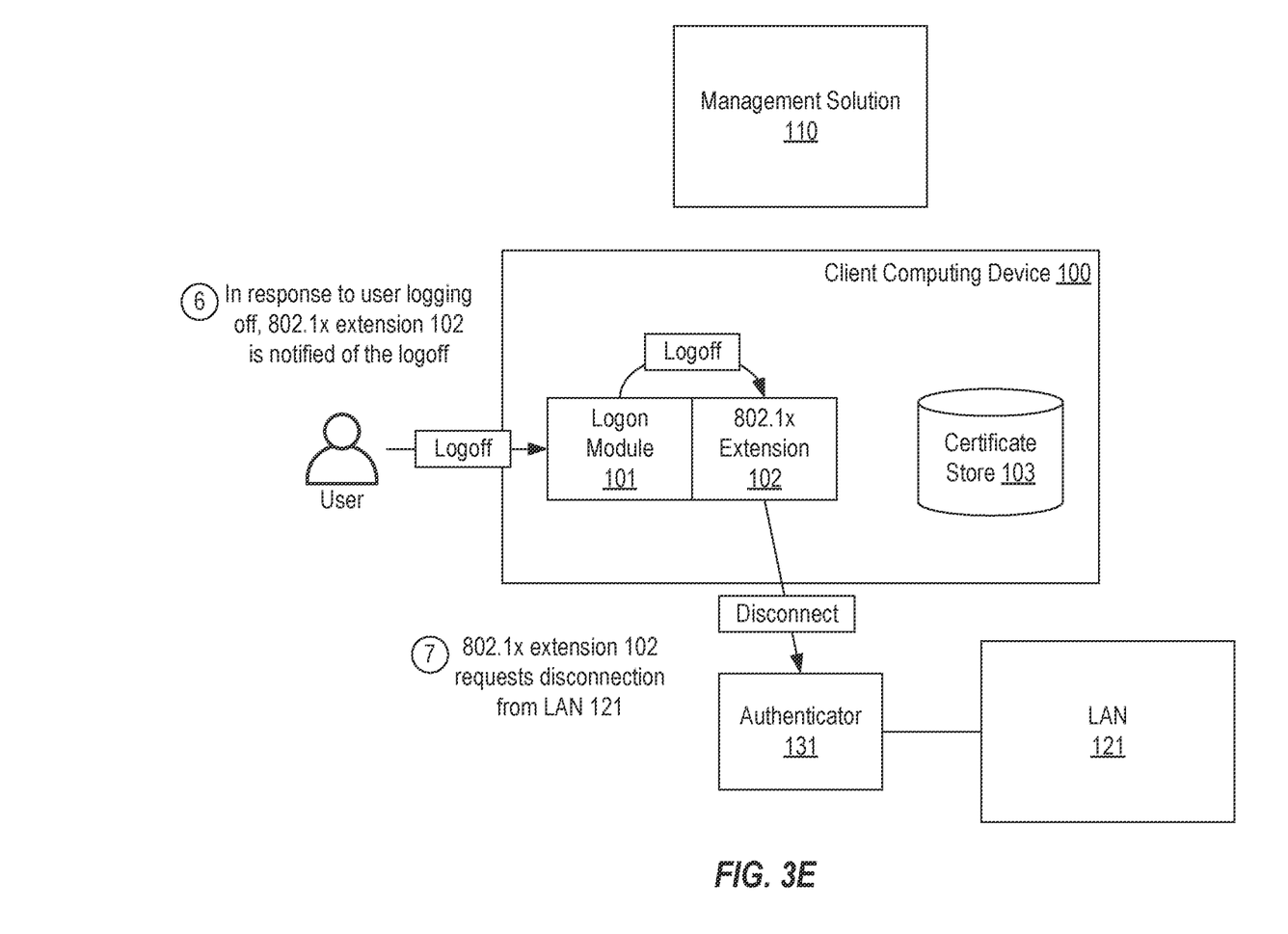

Turning to FIG. 3E, it is now assumed that the user logs off from client computing device 100 (including cases where the user restarts or shuts down client computing device 100). In step 6 and in response to being notified of the logoff, 802.1x extension 102 can request that authenticator 131 disconnect client computing device 100 from LAN 121. For example, in embodiments where 802.1x extension 102 implements the Extensible Authentication Protocol over LAN (EAPoL), 802.1x extension 102 could send an EAPoL logoff message to authenticator 131. As part of step 6, 802.1x extension 102 could also disable 802.1x authentication on client computing device 100.

Figure 3F:
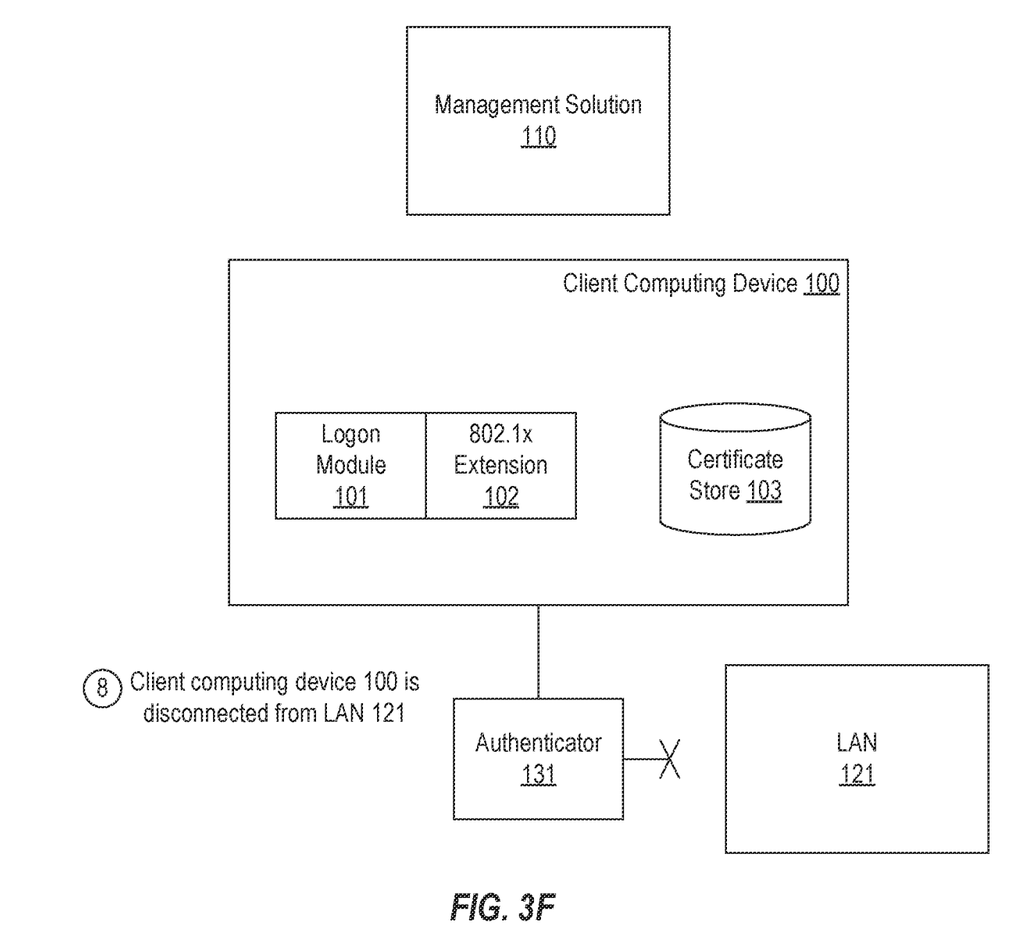

Turning to FIG. 3F, in step 8, client computing device 100 is disconnected from LAN 121. For example, authenticator 131 can close the port by which client computing device 100 was connected to LAN 121 such that client computing device 100 cannot be reconnected to LAN 121 without again performing the 802.1x authentication for a subsequently logged in user. Also, by disabling 802.1x authentication on client computing device 100, when a login again occurs on client computing device 100, 802.1x authentication will not be performed using the now logged off user's user credentials.

If another user were to subsequently log in to client computing device 100 and the other user is not authorized to access LAN 121, the 802.1x authentication that is performed using the user credentials of this other user would not be successful thus preventing client computing device 100 from being connected to LAN 121 while this other user is logged in. Instead, the client computing device 100 could be connected to guest LAN 122 while the other user is logged in. On the other hand, in the same user again logged in (or another user that is authorized to access LAN 121), 802.1x extension 102 could repeat the above-described process to reconnect client computing device 100 to LAN 121. This logged-in-user-specific 802.1x authentication can be performed without any manual intervention by an administrator.

In summary, embodiments of the present invention enable a multi-user client computing device to be selectively connected to a LAN by applying logged-in-user-specific 802.1x security during 802.1x authentication. The multi-user client computing device can also be automatically disconnected from the LAN and 802.1x authentication can be disabled when the user logs off from the multi-user client computing device to thereby prevent the multi-user client computing device from being connected to the LAN without again applying logged-in-user-specific 802.1x security during 802.1x authentication.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for applying logged-in-user-specific 802.1x security on a multi-user client computing device, the method comprising:
   integrating an 802.1x extension with a logon module on the multi-user client computing device, wherein the logon module is configured to log users into the multi-user client computing device by receiving and verifying user credentials provided by the users;
   in response to a first user of the users providing user credentials to the logon module and in response to the logon module verifying the user credentials of the first user to logging the first user in to the multi-user client computing device, obtaining, by the 802.1x extension and from the logon module, the user credentials of the first user; and
   in response to obtaining the user credentials of the first user, using, by the 802.1x extension, the user credentials of the first user to obtain one or more certificates of the first user; and
   performing, by the 802.1x extension, 802.1x authentication using the user credentials of the first user and the one or more certificates of the first user to attempt to connect the multi-user client computing device to a local area network.

2. The method of claim 1, wherein the user credentials of the first user comprise a username and password.

3. The method of claim 1, further comprising:
   using the user credentials of the first user to identify an authentication type to use in the 802.1x authentication.

4. The method of claim 1, further comprising:
   detecting that the first user has logged off from the multi-user client computing device; and
   disconnecting the multi-user client computing device from the local area network.

5. The method of claim 1, further comprising:
   detecting that the first user has logged off from the multi-user client computing device; and
   disabling the 802.1x authentication on the multi-user client computing device.

6. The method of claim 1, further comprising:
   in response to the 802.1x authentication being unsuccessful, connecting the multi-user client computing device to a guest local area network.

7. The method of claim 1, wherein the 802.1x extension is a custom credential provider or a pluggable authentication module.

8. The method of claim 1, further comprising:
   in response to a second user logging in to the multi-user client computing device, obtaining user credentials of the second user that were used to log the second user into the multi-user client computing device; and
   performing 802.1x authentication using the user credentials of the second user to attempt to connect the multi-user client computing device to the local area network.

9. One or more computer storage media storing computer executable instructions which when executed implement a method for applying logged-in-user-specific 802.1x security on a multi-user client computing device, the method comprising:
   integrating an 802.1x extension with a logon module on the multi-user client computing device, wherein the logon module is configured to log users into the multi-user client computing device by receiving and verifying user credentials provided by the users;
   in response to a first user of the users providing user credentials to the logon module and in response to the logon module verifying the user credentials of the first user to log the first user in to the multi-user client computing device, obtaining, by the 802.1x extension and from the logon module, the user credentials of the first user; and
   in response to obtaining the user credentials of the first user, using, by the 802.1x extension, the user credentials of the first user to obtain one or more certificates of the first user; and
   performing, by the 802.1x extension, 802.1x authentication using the user credentials of the first user and the one or more certificates of the first user to attempt to connect the multi-user client computing device to a local area network.

10. The computer storage media of claim 9, wherein the method further comprises:
    using the user credentials of the first user to identify an authentication type to use in the 802.1x authentication.

11. The computer storage media of claim 9, wherein the method further comprises:
    detecting that the first user has logged off from the multi-user client computing device; and
    disconnecting the multi-user client computing device from the local area network.

12. The computer storage media of claim 9, wherein the method further comprises:
    detecting that the first user has logged off from the multi-user client computing device; and
    disabling the 802.1x authentication on the multi-user client computing device.

13. The computer storage media of claim 9, wherein the method further comprises:
    in response to a second user logging in to the multi-user client computing device, obtaining user credentials of the second user that were used to log the second user into the multi-user client computing device; and
    performing 802.1x authentication using the user credentials of the second user to attempt to connect the multi-user client computing device to the local area network.

14. A multi-user client computing device comprising:
    one or more processors; and
    computer storage media storing computer executable instructions which when executed implement an 802.1x extension that is configured to perform 802.1x authentication using user credentials that were used to log multiple users into the multi-user client computing device by performing the following:
    integrating the 802.1x extension with a logon module on the multi-user client computing device, wherein the logon module is configured to log the multiple users into the multi-user client computing device by receiving and verifying user credentials provided by the multiple users;
    in response to a first user of the multiple users providing user credentials to the logon module and in response to the logon module verifying the user credentials of the first user to log the first user in to the multi-user client computing device, obtaining, by the 802.1x extension and from the logon module, the user credentials of the first user; and in response to obtaining the user credentials of the first user, using, by the 802.1x extension, the user credentials of the first user to obtain one or more certificates of the first user; and performing, by the 802.1x extension, 802.1x authentication using the user credentials of the first user and the one or more certificates of the first user to attempt to connect the multi-user client computing device to a local area network.

15. The multi-user client computing device of claim 14, wherein the 802.1x extension is further configured to:

detect when the first user has logged off from the multi-user client computing device; and disable the 802.1x authentication on the multi-user client computing device.

16. The computer storage media of claim 9, wherein the user credentials of the first user comprise a username and password.

17. The multi-user client computing device of claim 14, wherein the user credentials of the first user comprise a username and password.

18. The multi-user client computing device of claim 14, wherein the method further comprises:

using the user credentials of the first user to identify an authentication type to use in the 802.1x authentication.

19. The multi-user client computing device of claim 14, wherein the method further comprises:

detecting that the first user has logged off from the multi-user client computing device; and disabling the 802.1x authentication on the multi-user client computing device.

20. The multi-user client computing device of claim 14, wherein the method further comprises:

in response to the 802.1x authentication being unsuccessful, connecting the multi-user client computing device to a guest local area network.

\* \* \* \* \*